United States Patent
Namuduri et al.

(10) Patent No.: US 10,408,184 B1
(45) Date of Patent: Sep. 10, 2019

(54) BRUSHLESS ELECTRIC STARTER SYSTEM WITH CLOSED-LOOP SPEED SYNCHRONIZATION CONTROL METHODOLOGY

(71) Applicant: GM Global Technology Operations LLC, Detroit, MI (US)

(72) Inventors: Chandra S. Namuduri, Troy, MI (US); Lei Hao, Troy, MI (US); Suresh Gopalakrishnan, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/967,915

(22) Filed: May 1, 2018

(51) Int. Cl.
  *F02N 11/08* (2006.01)
  *F16F 15/30* (2006.01)

(52) U.S. Cl.
  CPC ...... *F02N 11/0844* (2013.01); *F02N 11/0851* (2013.01); *F02N 2011/0896* (2013.01); *F02N 2200/022* (2013.01); *F02N 2200/041* (2013.01); *F02N 2200/101* (2013.01); *F02N 2300/102* (2013.01); *F02N 2300/2011* (2013.01); *F16F 15/30* (2013.01)

(58) Field of Classification Search
  CPC .. F02N 11/08; F02N 11/0844; F02N 11/0851; F02N 2011/0896; F02N 2200/022; F02N 2200/041; F02N 2200/101; F02N 2300/102; F02N 2300/2011; F16F 15/30
  See application file for complete search history.

(56) References Cited

U.S. PATENT DOCUMENTS

| 4,718,290 A * | 1/1988 | Murata ............... F02B 61/06 310/62 |
| 8,643,238 B2 * | 2/2014 | Ling ..................... H02K 53/00 310/113 |

FOREIGN PATENT DOCUMENTS

| CN | 2711983 Y | 7/2005 |
| EP | 0619427 B1 | 10/1994 |
| JP | 2000104650 A | 4/2000 |

OTHER PUBLICATIONS

Quanbao Zhou, John Houldcroft, "Cold engine cranking torque requirement analysis," SAE International Inc., 2007, JSAE 20077002.
(Continued)

*Primary Examiner* — Hieu T Vo
(74) *Attorney, Agent, or Firm* — Quinn IP Law (57) ABSTRACT

An electric starter system for a powertrain or other system having an engine includes a solenoid device coupled to a pinion gear, a brushless starter motor, and a controller. The starter motor has actual machine speed, and is connectable to the flywheel via the pinion gear during a change-of-mind event when a commanded engine auto-stop sequence is interrupted before completion. When engine speed exceeds a threshold speed and is less than a calibrated starting speed, the controller executes a method in which closed-loop speed control of the starter motor is enabled using the engine speed as a reference value until an effective machine speed is within a permissible speed delta of engine speed. The controller causes the solenoid device to translate the pinion gear into engagement with the flywheel and starter motor, disables closed-loop speed control, and commands the starter motor to start the engine.

20 Claims, 3 Drawing Sheets

(56) References Cited

OTHER PUBLICATIONS

Hao et al, U.S. Appl. No. 15/961,128, filed Apr. 24, 2018.
Hao et al, U.S. Appl. No. 15/961,094, filed Apr. 23, 2018.
Namuduri et al, U.S. Appl. No. 15/967,918, filed May 1, 2018.
Hao et al, U.S. Appl. No. 15/967,910, filed May 1, 2018.

* cited by examiner

BRUSHLESS ELECTRIC STARTER SYSTEM WITH CLOSED-LOOP SPEED SYNCHRONIZATION CONTROL METHODOLOGY

INTRODUCTION

An internal combustion engine generates engine torque in response to an acceleration request. When the engine is used as part of a powertrain, the generated engine torque is transmitted to a coupled load through a power transmission arrangement, such as a planetary gear arrangement or a gearbox. In some powertrain configurations, a rotor of an electric machine is selectively coupled to a flywheel of the engine, typically to a gear element mounted to the flywheel. Motor torque from the electric machine is used to accelerate the engine. Torque from the electric machine may be used to support the engine's cranking and starting function during an engine auto-start event, with the electric machine in such an application typically referred to as a starter motor.

SUMMARY

An electric starter system is disclosed herein for use with an internal combustion engine. The electric starter system includes a pinion gear, a solenoid device, and brushless starter motor, i.e., an electric machine using an electronic commutator instead of physical conductive brushes. The starter motor is selectively connectable to a flywheel of the engine via the pinion gear in response to a requested engine start event, with the pinion gear being configured to translate into meshed engagement with the flywheel and the starter motor, e.g., through a splined or toothed planetary gear interface, via operation of the solenoid device.

A controller is used as part of the above-noted electric starter system. The controller, e.g., an engine control unit, is configured to achieve a rapid tip-in response, particularly during a change-of-mind event during a commanded engine auto-stop maneuver. As used herein, the term "change-of-mind event" refers to a human or electronic operator of a powertrain, or of another system having the engine, depressing an accelerator pedal or otherwise making an acceleration request of the engine requiring an immediate power delivery from the engine before the engine has a chance to come to a complete stop, i.e., a commanded auto-stop sequence of the engine is interrupted before its completion.

To achieve the desired ends, the controller selectively employs closed-loop control logic in the speed control of the starter motor, doing so using engine speed as a control variable. Closed-loop speed control occurs prior to a commanded engagement of the pinion gear with the flywheel. The controller thereby ensures that a permissible "speed delta", i.e., a speed differential between the rotational speed of the starter motor referred to the crank shaft, i.e., the "effective machine speed", and the engine speed, remains within a predetermined range sufficient for reducing noise, vibration, and harshness (NVH) effects during subsequent pinion gear-flywheel engagement.

In a particular embodiment, the electric starter system includes a solenoid device coupled to a pinion gear, a brushless starter motor, and a controller. The starter motor, or more precisely a rotor thereof, rotates with an actual machine speed, and is selectively connectable to the flywheel of the engine via the pinion gear during a change-of-mind event in which a commanded auto-stop sequence of the engine is interrupted by a requested acceleration of the engine. The controller is in communication with the solenoid device and the starter motor, either directly or via a motor control processor, and is configured, in response to the change-of-mind engine event, to compare the engine speed to a first threshold speed. When the engine speed exceeds the first threshold speed, but remains less than a second higher threshold speed, the controller enables closed-loop speed control of the starter motor using the engine speed as a feedback variable until an effective machine speed of the starter motor is within a permissible range or delta of the engine speed.

The effective machine speed is the actual machine speed multiplied by an overall gear reduction ratio of the electric starter system. The controller transmits a control signal to the solenoid device, either directly or through an intervening control device such as a motor control processor, to cause the solenoid device to translate the pinion gear into meshed engagement with the flywheel and the starter motor. The controller thereafter disables the closed-loop speed control. The brushless starter motor then delivers maximum motor torque to the flywheel via the pinion gear until the engine reaches the cranking speed where the engine is fueled and fired to meet one or more start completion conditions.

The first threshold speed may be less than half of the calibrated starting speed. In some embodiments, the speed delta may be between 10 RPM and 100 RPM.

The controller may be configured to wait through a calibrated duration of delay before commanding the brushless starter motor to deliver the maximum motor torque to the flywheel, with the calibrated duration of delay being sufficient for ensuring contact between the pinion gear and the flywheel, with subsequent full meshed engagement of the pinion gear and flywheel.

The controller may enable the closed-loop speed control of the brushless starter motor using a speed control loop time for the brushless starter motor that, in some embodiments, is less than half of an engine speed update time of the controller.

The solenoid device and the brushless starter motor may be optionally powered via an auxiliary voltage bus having a nominal voltage level of 15V.

The controller may be electrically connected to the solenoid device over a control line having a voltage level of 15V or less. Alternatively, the controller may be electrically connected to a motor control processor of the brushless starter motor via a high-speed serial link. The electric starter system, when used aboard a vehicle having a CAN bus and an engine control module (ECM) as the controller, may use the CAN bus as the high-speed serial link.

The solenoid device may be powered by a driver circuit incorporated, optionally, into the brushless starter motor along with a power inverter module, and controlled by the motor control processor also integrated into the brushless starter motor assembly. The brushless starter motor and the solenoid device may be controlled via the high-speed serial link/CAN bus in such an embodiment.

A powertrain is also disclosed that includes an internal combustion engine having an engine speed and a flywheel, a transmission coupled to the engine, a load coupled to the transmission, and the electric starter system noted above.

A method for controlling the electric starter system is also disclosed.

The above summary is not intended to represent every embodiment or aspect of the present disclosure. Rather, the foregoing summary exemplifies certain novel aspects and features as set forth herein. The above noted and other features and advantages of the present disclosure will be readily apparent from the following detailed description of

The present disclosure is susceptible to modifications and alternative forms, with representative embodiments shown by way of example in the drawings and described in detail below. Inventive aspects of this disclosure are not limited to the particular forms disclosed. Rather, the present disclosure is intended to cover modifications, equivalents, combinations, and alternatives falling within the scope of the disclosure as defined by the appended claims.

DETAILED DESCRIPTION

Embodiments of the present disclosure are described herein. The various embodiments are examples of the present disclosure, with other embodiments in alternative forms being conceivable by one of ordinary skill in the art in view of the disclosure. The figures are not necessarily to scale. Some features may be exaggerated or minimized to show details of particular components. Therefore, specific structural and functional details disclosed herein are not to be interpreted as limiting, but rather as a representative basis for teaching one skilled in the art to variously employ the present disclosure. As those of ordinary skill in the art will also understand, features illustrated and described with reference to a given one of the figures may be combinable with features illustrated in one or more other figures in order to produce embodiments that are not explicitly illustrated or described. The combinations of features illustrated thus serve as representative embodiments for typical applications. Various combinations and modifications of the features consistent with the teachings of this disclosure, however, could be desired for particular applications or implementations.

Figure 1:
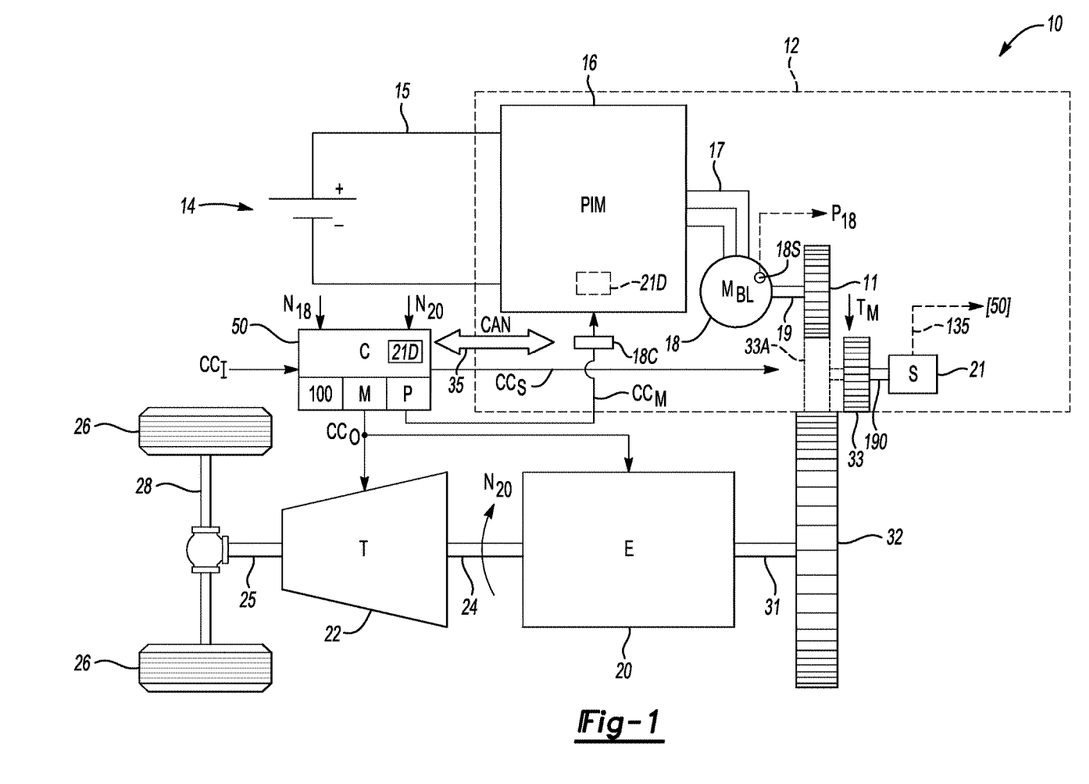
FIG. 1 is a schematic illustration of an example electric starter system for an engine, with the electric starter system including a brushless starter motor, a pinion gear, and a solenoid device that are collectively controlled during a change-of-mind/tip-in event conducted during an engine stop event.

Referring to the drawings, wherein like reference numbers refer to the same or like components in the several Figures, an example powertrain 10 is shown schematically in FIG. 1 having an engine (E) 20 coupled via a crankshaft 31 to a flywheel 32. For illustrative simplicity, the flywheel 32 is depicted as a ring gear, although in a practical embodiment the flywheel 32 and such a ring gear may be separate components mounted together to rotate in unison. The powertrain 10 also includes an electric starter system 12 operable for automatically cranking and starting the engine 20 during an engine auto-start event, for instance after the engine 20 has been turned off at idle to minimize idle fuel consumption. One such engine start event is the above-noted change-of-mind event occurring during but prior to completion of a commanded auto-stop of the engine 20.

The electric starter system 12 includes a poly-phase/alternating current (AC) brushless electric machine, hereinafter referred to as starter motor (MBL) 18. As such, the starter motor 18 employs an electronic commutator using solid-state switches to provide cranking torque in support of a start-stop function of the engine 20. The starter motor 18 includes a rotor 19 coupled to a planetary gear system 11, e.g., a ring gear and/or other gear elements. A position sensor 18S such as a Hall-effect sensor may be used to measure angular position (arrow $P_{18}$) of the rotor 19, with a motor control processor 18C therefore able to calculate a rotational speed of the rotor 19 using the angular position (arrow $P_{18}$), with the rotational speed of the rotor 19 hereinafter referred to as the machine speed ($N_{18}$). The machine speed ($N_{18}$) can thereafter be communicated to the controller 50 via the communication bus 35.

The electric starter system 12 also includes a solenoid device (S) 21 controlled via a driver circuit 21D, with the solenoid device 21 coupled to a pinion gear 33 via a shaft 19O, and possibly including a lever (not shown), with the pinion gear 33 configured to be selectively engaged with the flywheel 32 via operation of the solenoid device 21. A power inverter module (PIM) 16, shown separately from the starter motor 18 for illustrative clarity, may be an integral part of the starter motor 18, and thus of the electric starter system 12.

As explained in further detail below with reference to FIGS. 2 and 3, a controller 50, such as an engine control module in an exemplary vehicle embodiment, is configured to execute a method 100 in the overall control of a torque operation of the starter motor 18. This occurs during a change-of-mind event in which an operator of the powertrain 10, whether a human operator or the controller 50 itself in an autonomous embodiment, requests an increase in engine speed ($N_{20}$) before the engine 20 has fully stopped.

Within the context of the change-of-mind event, the controller 50 may consider multiple scenarios. In a low-speed change-of-mind event, e.g., when engine speed ($N_{20}$) is below a first predetermined threshold speed (N1), such as about 150-200 RPM for an example 4-cylinder engine, the pinion gear 33 is first engaged with the flywheel 32, with the starter motor 18 later enabled and energized such that engine speed ($N_{20}$) rises above a second predetermined threshold speed (N2), i.e., an engine firing speed, which is about 350 RPM for the same example 4-cylinder engine. High-speed change-of-mind events may be handled when the engine speed ($N_{20}$) is above the second predetermined threshold speed (N2) at or above which the engine 20 can be fueled and fired without enabling the starter motor 18.

Between the low-speed and high-speed examples, intermediate speed change-of-mind events may occur when the engine speed ($N_{20}$) is between the respective first and second predetermined threshold speeds (N1) and (N2). In such a condition, the starter motor 18 is enabled by the controller 50 and commanded to increase the machine speed ($N_{18}$), which is referenced to the crankshaft 31, such that an effective machine speed is within a permissible speed delta (Δ) of engine speed ($N_{20}$). That is, a raw/sensed motor speed that is ultimately determined using the position sensor 18S of FIG. 1 is multiplied by an overall gear reduction ratio, i.e., a predetermined value, and used as the effective machine speed when comparing with the engine speed ($N_{20}$) in the context of the disclosure. The speed delta (Δ) may be a predetermined/programmed value, for example about 10-100 RPM depending on the precision achievable by the overall system. Effective machine speed may preferably be less than engine speed ($N_{20}$) during the engagement of the pinion gear 33 so as to lessen NVH effects and transient motor currents. Closed-loop speed control in these scenarios may be performed using a speed control loop time for the brushless starter motor 18 that is less than half of an engine speed update time of the controller 50.

The controller 50 in the embodiment of FIG. 1 may be used to control a position of the pinion gear 33 via the output voltage of a solenoid driver circuit 21D, while the starter motor 18 may be controlled over a high-speed serial link 35, e.g., a controller area network (CAN) having an example baud rate of 1 Mb/s or more. Rather than using a permanently-engaged starter motor 18 with a one-way clutch disposed between the crankshaft 31 and flywheel 32, such that one member continuously rotates with the engine 20, or other approaches using "dual-tandem" configurations in which separate solenoid devices 21 are used to control the pinion gear 33 and energize a brush-type starter motor, the present approach instead employs the solenoid device 21 as a single solenoid within the context of the electric starter system 12.

To reduce noise, vibration, and harshness (NVH) effects during the above-noted change-of-mind event conducted during an auto-stop of the engine 20, the controller 50 executes logic embodying the method 100 using engine speed ($N_{20}$) as a control value. The controller 50 uses closed-loop control of the machine speed ($N_{18}$) of the brushless starter motor 18 prior to engaging the pinion gear 33 with the flywheel 32, with engine speed ($N_{20}$) being a feedback control variable in the closed-loop process. The controller 50 thereby maintains the speed delta (Δ) between effective machine speed and engine speed ($N_{20}$) to within a permissible range.

Further with respect to the powertrain 10 and electric starter system 12 shown in FIG. 1, the engine 20 may be embodied a gasoline or diesel engine, and ultimately outputs engine torque to an output shaft 24. The output shaft 24 may be coupled to a transmission (T) 22, e.g., via a hydrodynamic torque converter or clutch (not shown). The transmission 22 ultimately delivers output torque at a particular gear or speed ratio to a transmission output member 25. The output member 25 in turn drives a coupled load via one or more drive axles 28, with the load depicted in FIG. 1 being a set of drive wheels 26 in an example automotive application. Other beneficial applications for the powertrain 10 may be envisioned, including power plants, robotics, mobile platforms, and non-motor vehicle applications such as watercraft, marine vessels, rail vehicles, and aircraft, and therefore the motor vehicle embodiment of FIG. 1 is intended to be illustrative of the disclosed concepts without limitation.

When the engine 20 is not running, such as after a fuel-conserving auto-stop event of the engine 20 at idle or when cruising with the engine 20 turned off, the electric starter system 12 may be electrically and automatically energized in response to solenoid control signals (arrow CCs) and motor control signals (arrow CCM) from or initiated by the controller 50 to selectively deliver starting motor torque (arrow $T_M$) to the flywheel 32 via the intervening pinion gear 33. A possible configuration for achieving such ends is the use of the solenoid device 21 situated as depicted in FIG. 1. The solenoid device 21 may include the shaft 190, possibly with a lever (not shown) located between the shaft 190 and the solenoid device 21 as noted above.

When the solenoid device 21 is energized in response to the solenoid control signals (arrow CCs), the energized solenoid device 21 linearly translates the pinion gear 33 to the position indicated at 33A, and thus into direct meshed engagement with mating teeth or splines on both the flywheel 32 and the planetary gear system 11. Once the engine 20 has started and is running at a speed sufficient to sustain fueling and internal combustion, the solenoid control signals (arrow CCs) are discontinued. As a result, the solenoid device 21 is de-energized. The pinion gear 33 is urged out of engagement with the flywheel 32 via a return action of the solenoid device 21. Other configurations may exist for selectively engaging the pinion gear 33 with the flywheel 32 and the ring gear 11, and therefore the illustrated embodiment is intended to be illustrative of the general concepts disclosed herein without limiting the electric starter system 12 to such an embodiment.

The electric starter system 12 of FIG. 1 may include or may be connected to a direct current (DC) battery pack 14, e.g., a multi-cell lithium ion, nickel metal hydride, or lead acid battery pack having positive (+) and negative (−) terminals. The battery pack 14 may be an auxiliary battery pack, e.g., having a nominal voltage at auxiliary levels, e.g., about 12-15V. Thus, in a vehicular embodiment of the powertrain 10 the solenoid device 21 may be powered by the output of driver circuit 21D controlled by the controller 50 over a control line, or by the motor control processor 18C in response to a message transmitted by the controller 50 to the motor control processor, e.g., over the CAN bus 35 or another high-speed serial communications link. The controller 50 may be electrically connected to the solenoid device 21 and the brushless starter motor 18 over separate control lines in a possible embodiment, with each control line possibly having a voltage level of 15V or less. Thus, the solenoid driver 21D is depicted in various locations in FIG. 1 to show possible embodiments, for instance within the PIM 16 or the controller 50.

In an exemplary case, the solenoid driver 21D can be a high-side MOSFET switch (not shown for the sake of simplicity) of suitable current rating between the positive (+) lead of the battery 14 and a first lead of a solenoid coil within the solenoid device 21D, wherein the second lead of such a solenoid coil is connected to the negative (−) lead of the battery 14 via vehicle/engine chassis ground. As will be appreciated by one of ordinary skill in the art of semiconductor-based driver circuits, the gate terminal of the MOSFET in this example embodiment is driven by a control line through a level shift circuit to switch the MOSFET into an "on"/conducting state to supply current to the solenoid coil at a level sufficient for enabling movement of a solenoid shaft, which in turn urges the pinion gear 33 to engage with the flywheel 32.

The electric starter system 12 may include the PIM 16, which in turn is electrically connected across the positive (+) and negative (−) terminals of the battery pack 14 via a DC voltage bus 15, as well as to a poly-phase/alternating current (AC) voltage bus 17. As noted above, while the PIM 16 is shown separately from the starter motor 18 for illustrative clarity, the PIM 16 may be integrated with the starter motor 18 in other embodiments. Also, while omitted from FIG. 1 for illustrative simplicity, the PIM 16 includes semiconductor switching pairs, typically MOSFETs, which are connected to positive (+) and negative (−) terminals via the DC voltage bus 15, and signal filtering circuit components which ultimately convert DC power from the battery pack 14 into poly-phase power on the AC voltage bus 17.

In turn, the AC voltage bus 17 is electrically connected to individual phase windings internal to the brushless starter motor 18. The starter motor 18 may be configured such that a calibrated back-electromotive force results for a given performance range, e.g., 3-5V at 6000 RPM, or other values ensuring that sufficient motor torque (arrow $T_M$) is available for starting the engine 20, e.g., 5-7 Nm within parameters of the DC voltage bus 15. The starter motor 18 may be variously configured as a surface permanent magnet machine, an internal permanent magnet machine, a drag-cup induction machine, a switched reluctance machine, or another type of brushless motor without limitation. As recognized herein, brushless motors such as the starter motor 18 may enjoy an extended operating life with an improved level of speed control precision relative to certain brush-type motors, among other possible benefits.

The controller 50 of FIG. 1 is configured to receive measured voltage, current, position, temperature, and/or other suitable electrical value as part of a set of input signals (arrow CO. The controller 50 may be variously implemented as one or more control devices collectively managing the motor torque (arrow $T_M$) from the starter motor 18 as part of the method 100. As noted above, the controller 50 is configured to control operation of the solenoid device 21 via the solenoid control signals (arrow CCs) and, at the same time, enable and energize the starter motor 18 via the motor control signals (arrow CCM), with the solenoid control signals (arrow CCs) and the motor control signals (arrow CCM) possibly being transmitted over separate control lines or transfer connectors. That is, the starter system 12 disclosed herein is characterized by a single solenoid, i.e., the solenoid device 21. As a result, the solenoid device 21 may be powered by the output of driver circuit 21D controlled by the controller 50 or the motor control processor 18C to energize coils or windings of the solenoid device 21 and thereby enable translation of the pinion gear 33 during an auto-stop condition.

Multiple controllers may be in communication via a high-speed serial bus, such as the CAN bus 35 illustrated in FIG. 1. The controller 50 may include one or more digital computers each having a processor (P), e.g., a microprocessor or central processing unit, as well as memory (M) in the form of read only memory, random access memory, electrically-programmable read only memory, etc., a high-speed clock, analog-to-digital and digital-to-analog circuitry, input/output circuitry and devices, and appropriate signal conditioning and buffering circuitry. In various embodiments of the electric starter system 12, the controller 50 may be electrically connected to the solenoid device 21 over a dedicated or direct control line 135 having a voltage level of 15V or less, with the connection indicated in FIG. 1 as "[50]".

Alternatively, the controller 50 may be electrically connected to the brushless starter motor 18 via the motor control processor 18C via the CAN bus 35 or another high-speed serial link. When the electric starter system 12 is used aboard a vehicle having the powertrain 10 and the CAN bus 35, for instance, the controller 50 may be embodied as or include an engine control module, with the above-noted high-speed serial link being the CAN bus 35. The solenoid device 21 may be powered by the solenoid driver circuit 21D, with the solenoid driver circuit 21D in other embodiments being incorporated alongside the PIM 16 as shown in FIG. 1 in which case the brushless starter motor 18 and the solenoid device 21 may both be controlled via the CAN bus 35.

The controller 50 may also store algorithms and/or computer executable instructions in memory (M), including the underlying algorithms or code embodying the method 100 described below, and transmit commands to the electric starter system 12 to enable performance of certain control actions according to the present disclosure.

The controller 50 is in communication with the engine 20 and receives, as part of the input signals (arrow CO, signals indicative of a speed and temperature of the engine 20, as well as other possible engine operating conditions or parameters. Such parameters include a starting request of the engine 20, whether operator-initiated or autonomously generated. The controller 50 is also in communication with the brushless starter motor 18, and thus receives signals indicative of current speed, current draw, torque, temperature, and/or other operating parameters. The controller 50 may also communicate with the battery pack 14 and receive signals indicative of a battery state of charge, temperature, and current draw, as well as a voltage across the respective DC and AC voltage buses 15 and 17. In addition to transmitting a torque request to the starter motor 18 via the CAN bus 35, or start request via line CCM or a solenoid control signal (arrow CCs), the controller 50 may also transmit output signals (arrow CCo) to the engine 20 and transmission 22 as part of the overall operating function of the controller 50.

Figure 2:
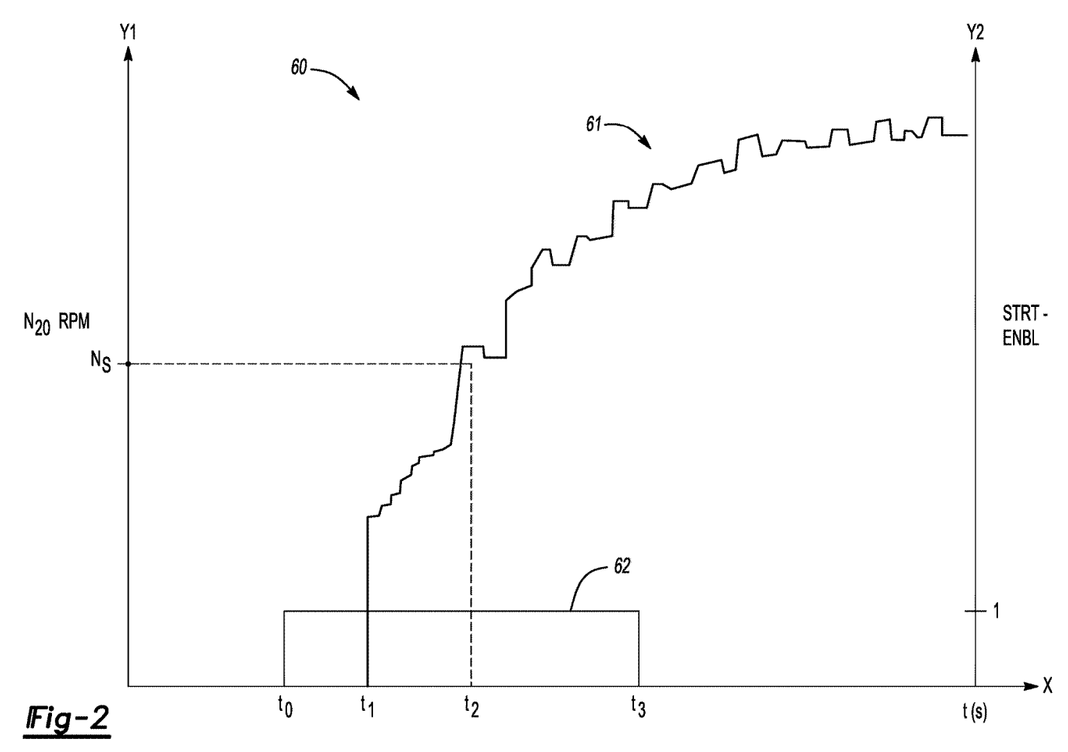
FIG. 2 is a time plot of engine speed and enabling signals used in the example electric starter system of FIG. 1.

Referring to representative traces 60 of FIG. 2, engine speed ($N_{20}$) is depicted on the vertical axis (Y1) in RPM, time (t) in seconds (s) is depicted on the horizontal axis (X), and a binary value (0 or 1) is depicted on the vertical axis (Y2). At to, the controller 50 of FIG. 1 enables operation of the solenoid device 21 followed by the brushless starter motor 18 at $t_1$, with solenoid device 21 enablement indicated by a bit flag 62 (STRT-ENBL) that is commanded high, i.e., changing from binary 0 to binary 1. At $t_1$, which may occur about 0.04 s after enabling the solenoid device 21 at to, the brushless starter motor 18 is enabled to urge the engine speed ($N_{20}$) to rapidly increase, as indicated by trace 61, reaching a calibrated starting speed of about 500 RPM at $t_2$ in the illustrated non-limiting example.

Engine speed ($N_{20}$) continues to increase after the brushless starter motor 18 is commanded off or disabled, which occurs at $t_3$ in FIG. 2 at about t=0.4 s. The present closed-loop control method 100, when used in conjunction with the single solenoid device 21 as described herein, may therefore improve NVH performance relative to approaches using open-loop control approaches, which see a random speed differential between a speed of the pinion gear 33 and a rotational speed of the flywheel 32 of FIG. 1 during change-of-mind engine restart events.

Figure 3:
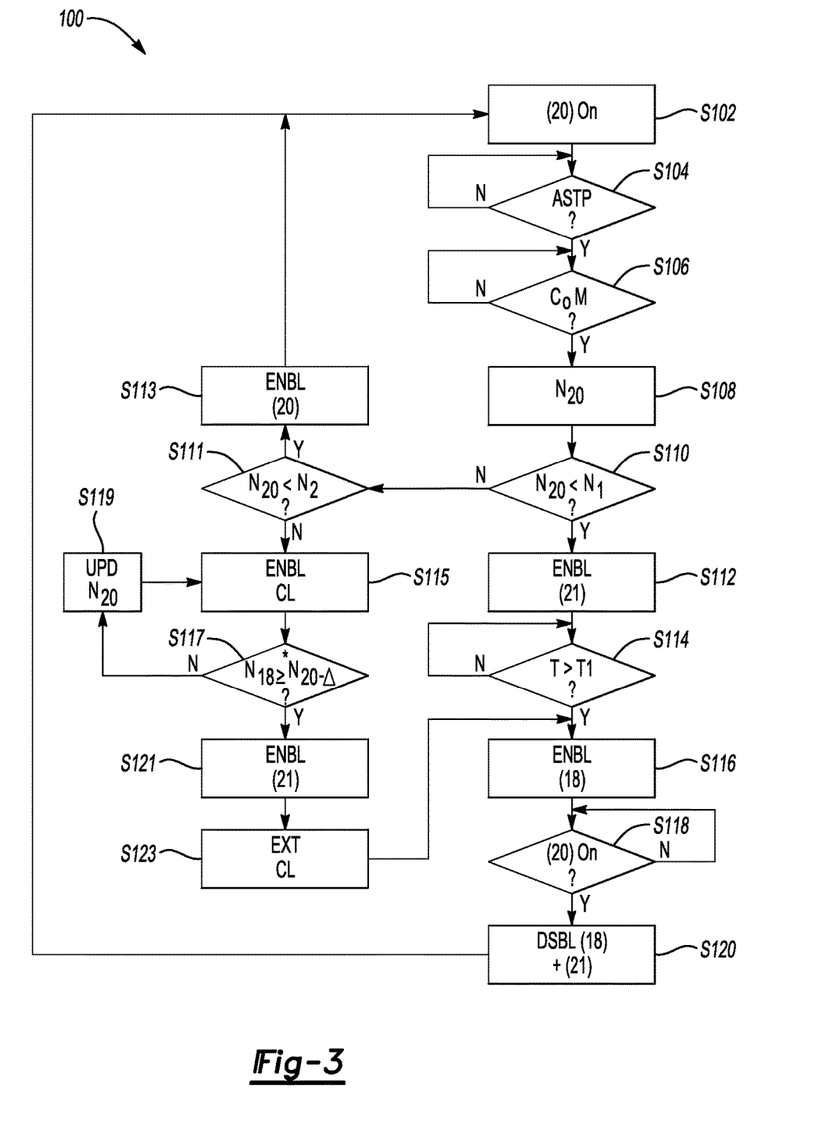
FIG. 3 is a flow chart describing an example embodiment of a method for synchronizing rotation of the pinion gear and flywheel of the engine depicted in FIG. 1 during tip-in of a change-of-mind auto-stop event.

Referring to FIG. 3, the method 100 according to an example embodiment commences with step S102. Referenced structural elements are depicted in FIG. 1. At step S102, the controller 50 verifies that the engine 20 is in an on/running state, as indicated by the label "(20)=ON". Step S102 may correspond to engine speed ($N_{20}$) being above a calibrated starting speed, e.g., 350-400 RPM for an example 4-cylinder engine 20, or another speed value indicative of sustained fueling and internal combustion functions of the engine 20. The method 100 then proceeds to step S104.

At step S104, the controller 50 next determines whether auto-stop ("ASTP") functionality has been enabled. An enabled logic state is indicative of a commanded auto-stop event of the engine 20. Step S104 is repeated in a loop until auto-stop is enabled, at which point the method 100 proceeds to step S106.

At step S106, with the controller 50 having determined at step S104 that an auto-stop function of the engine 20 is enabled, the controller 50 next determines if a change-of-mind ("CoM") event is present. For instance, as part of step S106 the controller 50 may process the input signals (arrow CO to determine if throttle tip-in is present in which an operator of the powertrain 10, e.g., a human operator/driver or the controller 50 operating in an autonomous mode, makes an acceleration request, such as by depressing an accelerator pedal (not shown) or increasing throttle. The method 100 proceeds to step S108 when the change-of-mind event is active, with the controller 50 otherwise repeating step S106.

At step S108, the controller 50 determines the present engine speed ($N_{20}$). Such a value may be reported via another control device, such as an engine control module if separate from the controller 50, or the engine speed ($N_{20}$) may be calculated or directly measured by the controller 50 when the controller 50 is itself an engine control module. The method 100 proceeds to step S110 once the engine speed ($N_{20}$) is determined.

Step S110 entails determining, once again via the controller 50, whether engine speed ($N_{20}$) is less than a first predetermined threshold speed (N1). The first predetermined threshold speed (N1) may be a speed lower than a calibrated starting speed of the engine 20. For instance, if a calibrated starting speed for an example 4-cylinder engine is 350-400 RPM, then the first predetermined threshold speed (N1) may, in a non-limiting case, be about 175-200 RPM, or less than 50 percent of the calibrated starting speed. The method 100 proceeds to step S111 when engine speed ($N_{20}$) exceeds the first predetermined threshold speed (N1), and to step S112 when engine speed ($N_{20}$) is less than the first predetermined threshold speed (N1).

At step S111, the controller 50 next determines whether engine speed ($N_{20}$) exceeds a second predetermined threshold speed (N2) that is greater than the first predetermined threshold speed (N1) noted above. The second predetermined threshold speed (N2) may correspond to the above-noted engine starting speed, e.g., 350-400 RPM depending on the number of cylinders used in the engine 20. The method 100 proceeds to step S115 when engine speed ($N_{20}$) is less than the second calibrated threshold speed (N2), and to step S113 in the alternative when engine speed ($N_{20}$) equals or exceeds the second calibrated threshold speed (N2).

At step S112, with the controller 50, having determined at preceding step S110 that engine speed ($N_{20}$) is less than the first predetermined threshold speed (N1), the controller 50 next enables engagement of the pinion gear 33. Step S112 may entail transmitting a control signal to power the solenoid device 21, e.g., to the solenoid driver circuit 21D, either via the controller 50 or the motor control processor 18C. In response to the supplied voltage, regardless of its source controller, the energized solenoid device 21 translates the pinion gear 21 into meshed engagement with the flywheel 32 of the engine 20. The method 100 then proceeds to step S114.

Step S113 is arrived at when engine speed ($N_{20}$) is sufficient for continuing with fueling and starting of the engine 20. Step S113 entails enabling a fueling function of the engine 20 ("ENBL (20)"), e.g., injection of gasoline or diesel fuel into cylinders of the engine 20 for combustion therein. The method 100 thereafter proceeds to step S102.

Step S114 includes initiating a counter via the controller 50 and then determining whether the counter's present count time (T) exceeds a predetermined delay duration (T1). Step S114 is repeated until the predetermined delay duration (T1) has elapsed, at which point the method 100 proceeds to step S116.

At step S115, the controller 50 enables closed-loop speed control of the brushless starter motor 18, e.g., by setting a corresponding bit flag, before proceeding to step S117.

Step S116 includes enabling the brushless starter motor 18 of FIG. 1 ("ENBL (18)) to crank and start the engine 20, along with enabling fueling of the engine 20. Both actions are achieved by operation of the controller 50 using corresponding control signals transmitted over the CAN bus 35 and/or a low-voltage line. The method then proceeds to step S118.

Step S117 includes comparing the effective machine speed ($N_{18}^*$) of the brushless starter motor 18 to an adjusted engine speed, i.e., engine speed ($N_{20}$) less a predetermined speed delta ($\Delta$). Actual machine speed ($N_{18}$ of FIG. 1) may be estimated via a state observer or measured using the example position sensor 18S, with the effective machine speed ($N_{18}^*$) being the machine speed ($N_{18}$) multiplied by an overall gear reduction ratio. The predetermined speed delta ($\Delta$) is a calibrated value, for as low as 5-10 RPM or as high as 50-100 RPM, or within a range of 10-100 RPM, with the actual predetermined speed delta ($\Delta$) used in a given application depending on the precision achievable by the overall system. The method 100 proceeds to step S119 when the effective machine speed ($N_{18}^*$) is less than the adjusted engine speed, and to step S121 in the alternative.

At step S118, the controller 50 next determines whether restart of the engine 20 is complete, i.e., whether the engine 20 is in on/running state ("(20) ON"). Step S118 continues until the restart event is complete, e.g., until engine speed ($N_{20}$) exceeds the second predetermined threshold speed (N2) for more than a calibrated time (e.g., 0.1 s), and then proceeds to step S120.

Step S119 entails updating engine speed ($N_{20}$) in memory (M) of the controller 50 shown in FIG. 1 before returning to step S115.

At step S120, the controller 50 disables operation of the brushless starter motor 18 and the solenoid device 21 ("DSBL (18)+(21)"). In turn, such control actions result in the disengagement of the pinion gear 33 from the flywheel 32 and stopping of the brushless starter motor 18. The method 100 thereafter proceeds to step S102.

At step S121, the controller 50 enables the solenoid device 21. This control action causes the solenoid device 21 to translate the pinion gear 33 into direct meshed engagement with the flywheel 32. The method 100 then proceeds to step S123.

Step S123 includes the controller 50 exiting the closed-loop control of the starter motor 18 that was initiated at step S115, for instance by registering a bit flag as binary 0. The method 100 thereafter proceeds to step S116.

The above-described method 100, when used in conjunction with the electric starter system 12 of FIG. 1, enables faster starts of the engine 20 using higher cranking speeds, which also allows for reduced delay and improved NVH performance. Improved tip-in performance may be enjoyed from a coasting state or other condition in which a change-of-mind event alters the progression of a commanded auto-stop event of the engine 20. These and other benefits will be readily appreciated by those of ordinary skill in the art in view of the forgoing disclosure.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. A powertrain comprising:
an internal combustion engine having an engine speed and a flywheel;
a transmission coupled to the engine;
a load coupled to the transmission; and
an electric starter system for starting the engine, the electric starter system comprising:
a pinion gear;
a solenoid device coupled to the pinion gear;
a brushless starter motor having an actual machine speed, and selectively connectable to the flywheel of the engine via the pinion gear during a change-of-mind event in which a commanded auto-stop sequence of the engine is interrupted before completion by a requested acceleration of the engine; and
a controller in communication with solenoid device and the starter motor, and configured, in response to the change-of-mind engine event, to:
compare the engine speed to a threshold speed that is less than half of a calibrated starting speed of the engine; and
responsive to the engine speed exceeding the threshold speed and being less than the calibrated starting speed:
enable closed-loop speed control of the starter motor using the engine speed as a feedback variable until an effective machine speed of the starter motor is within a permissible speed delta of the engine speed, the permissible speed delta being between 10 RPM and 100 RPM, and the effective machine speed being the actual machine speed multiplied by an overall gear reduction ratio of the electric starter system;
transmit a control signal to the solenoid device to cause the solenoid device to translate the pinion gear into engagement with the flywheel and the starter motor;
disable the closed-loop speed control upon the engagement with the flywheel and the starter motor; and
command the brushless starter motor to deliver motor torque to the flywheel via the pinion gear until the engine starts.

2. The powertrain of claim 1, wherein the powertrain is used as part of a vehicle having a set of drive wheels as the load.

3. The powertrain of claim 2, wherein the vehicle includes a controller area network (CAN) bus, the controller is an engine control module (ECM) of the vehicle, and the high-speed serial link is the CAN bus.

4. The powertrain of claim 1, wherein the controller is configured to enable the closed-loop speed control of the brushless starter motor using a speed control loop time for the brushless starter motor that is less than half of an engine speed update time of the controller.

5. The powertrain of claim 1, wherein the controller is electrically connected to the solenoid device over a low-voltage control line having a voltage level of 15V or less.

6. The powertrain of claim 1, wherein the solenoid device is powered by a solenoid driver circuit that is incorporated into the brushless starter motor along side a power inverter module, and wherein the brushless starter motor includes a motor control processor that is electrically connected to the solenoid driver circuit, the motor control processor being enabled by the controller via a high-speed serial link or a discrete control line with an operating voltage of 15V or less.

7. An electric starter system for use with an internal combustion engine having an engine speed and a flywheel, the electric starter system comprising:
a pinion gear;
a solenoid device coupled to the pinion gear;
a brushless starter motor having an actual machine speed, and selectively connectable to the flywheel of the engine via the pinion gear during a change-of-mind event in which a commanded auto-stop sequence of the engine is interrupted by a requested acceleration of the engine; and
a controller in communication with the solenoid device and the starter motor, and configured, in response to the change-of-mind engine event, to:
compare the engine speed to a threshold speed that is less than a calibrated starting speed of the engine; and
responsive to the engine speed exceeding the threshold speed and being less than the calibrated starting speed:
enable closed-loop speed control of the starter motor using the engine speed as a reference value until an effective machine speed of the starter motor is within a permissible range or speed delta of the engine speed, the effective machine speed being the actual machine speed multiplied by an overall gear reduction ratio of the electric starter system;
transmit a control signal to enable the solenoid device and thereby cause the solenoid device to translate the pinion gear into engagement with the flywheel and the starter motor;
disable the closed-loop speed control upon the engagement with the flywheel and the starter motor; and
command the brushless starter motor to deliver motor torque to the flywheel via the pinion gear until the engine starts.

8. The electric starter system of claim 7, wherein the threshold speed is less than half of the calibrated starting speed.

9. The electric starter system of claim 7, wherein the permissible range or speed delta is between 10 RPM and 100 RPM.

10. The electric starter system of claim 7, wherein the controller is configured to wait through a calibrated duration of delay after enabling starter pinion engagement before commanding the brushless starter motor to deliver the motor torque to the flywheel, the calibrated duration of delay being sufficient for ensuring full meshed engagement of the pinion gear with the flywheel.

11. The electric starter system of claim 7, wherein the controller is configured to enable the closed-loop speed control of the brushless starter motor using a speed control loop time for the brushless starter motor that is less than half of an engine speed update time of the controller.

12. The electric starter system of claim 7, wherein the solenoid device and the brushless starter motor are powered via an auxiliary voltage bus having a nominal voltage level of 15V or less.

13. The electric starter system of claim 7, wherein the controller is electrically connected to the solenoid device over a control line having a nominal voltage level of 15V or less.

14. The electric starter system of claim 7, wherein the controller is electrically connected to a motor control processor of the brushless starter motor via a high-speed serial link, and wherein the motor control processor is configured to energize a driver circuit of the solenoid device via a pulse width modulation voltage responsive to a request from the controller.

15. The electric starter system of claim 14, wherein the electric starter system is used aboard a vehicle having a controller area network (CAN) bus, and also having an engine control module (ECM) as the controller, and wherein the high-speed serial link is the CAN bus.

16. The electric starter motor of claim 15, wherein the electric starter system includes a power inverter module (PIM), and wherein the driver circuit is incorporated into the PIM.

17. A method for controlling an electric starter system for use with an internal combustion engine having an engine speed and a flywheel, the method comprising:
   in response to a change-of-mind engine event in which a commanded auto-stop sequence of the engine is interrupted by a requested acceleration of the engine:
      comparing, via a controller, the engine speed to a threshold speed that is less than half of a calibrated starting speed of the engine; and
      responsive to the engine speed exceeding the threshold speed and being less than the calibrated starting speed:
         enabling closed-loop speed control of a brushless starter motor via the controller using the engine speed as a feedback variable, wherein the brushless starter motor includes an actual machine speed, and is selectively connectable to the flywheel of the engine via a pinion gear during a change-of-mind event;
         maintaining the closed-loop speed control until an effective machine speed of the starter motor is within a permissible speed delta of the engine speed of at least 10 RPM, the effective machine speed being the actual machine speed multiplied by an overall gear reduction ratio of the electric starter system;
         transmitting a control signal to a solenoid device to cause the solenoid device to translate the pinion gear into engagement with the flywheel and the starter motor;
         disabling the closed-loop speed control upon the engagement with the flywheel and the starter motor; and
         commanding the brushless starter motor to deliver motor torque to the flywheel via the pinion gear until the engine starts.

18. The method of claim 17, further comprising: enabling the closed-loop speed control of the brushless starter motor using a speed control loop time for the brushless starter motor that is less than half of an engine speed update time of the controller.

19. The method of claim 17, wherein transmitting the control signal to the solenoid device occurs over a low-voltage control line having a voltage level of 15V or less.

20. The method of claim 17, wherein the solenoid device includes a driver circuit that is incorporated into a power inverter module, the driver circuit being connected to a motor control processor of the brushless starter motor, and wherein maintaining the closed-loop speed control and transmitting the control signal to the solenoid device occur over a high-speed serial link between the controller and the motor control processor.

\* \* \* \* \*